US012449167B2

(12) United States Patent
Tan

(10) Patent No.: US 12,449,167 B2
(45) Date of Patent: Oct. 21, 2025

(54) CONTROLLER AND CONTROL METHOD OF THERMOELECTRIC COOLER-HEATER DEVICE

(71) Applicant: SG MICRO CORP, Beijing (CN)

(72) Inventor: Lei Tan, Beijing (CN)

(73) Assignee: SG MICRO CORP, Beijing (CN)

( * ) Notice: Subject to any disclaimer, the term of this patent is extended or adjusted under 35 U.S.C. 154(b) by 351 days.

(21) Appl. No.: 18/044,229

(22) PCT Filed: Aug. 18, 2021

(86) PCT No.: PCT/CN2021/113309
§ 371 (c)(1),
(2) Date: Mar. 7, 2023

(87) PCT Pub. No.: WO2022/048445
PCT Pub. Date: Mar. 10, 2022

(65) Prior Publication Data

US 2023/0324090 A1 Oct. 12, 2023

(30) Foreign Application Priority Data

Sep. 7, 2020 (CN) ........................ 202010929394.4

(51) Int. Cl.
*F25B 21/04* (2006.01)

(52) U.S. Cl.
CPC ........ *F25B 21/04* (2013.01); *F25B 2321/021* (2013.01)

(58) Field of Classification Search
CPC ...................................................... F25B 21/04
See application file for complete search history.

(56) References Cited

U.S. PATENT DOCUMENTS 3,815,668 A 6/1974 Carlson
5,088,098 A 2/1992 Muller et al.
(Continued)

FOREIGN PATENT DOCUMENTS

CN 1553573 A 12/2004
CN 202406025 U 8/2012
(Continued)

OTHER PUBLICATIONS

International Search Report and Written Opinion for International Application No. PCT/CN2021/113309, dated Nov. 12, 2021, 12 pages.
(Continued)

*Primary Examiner* — Filip Zec
(74) *Attorney, Agent, or Firm* — Westman, Champlin & Koehler, P.A.

(57) ABSTRACT

Disclosed is a controller and a control method of a thermoelectric cooler-heater device. The controller includes a switching power supply coupled to the thermoelectric cooler-heater device to provide a first driving current; and a constant-current constant-voltage power supply coupled to the thermoelectric cooler-heater device to provide a second driving current. According to a temperature detection signal, one of the switching power supply and the constant-current constant-voltage power supply operates, the first driving current is a continuous driving current flowing from an anode end to a cathode end of the thermoelectric cooler-heater device, the second driving current is a pulse driving current flowing from the cathode end to the anode end. In cooling mode, the controller uses the switching power supply to provide continuous output to improve monotonicity; in heating mode, the controller uses the constant-current constant-voltage power supply to provide pulse output to improve circuit efficiency and provide protection function.

20 Claims, 5 Drawing Sheets

(56) References Cited

U.S. PATENT DOCUMENTS

| | | | | |
|---|---|---|---|---|
| 6,089,310 | A | 7/2000 | Toth et al. | |
| 7,504,746 | B2 | 3/2009 | Wong et al. | |
| 7,642,795 | B2 | 1/2010 | Hashimoto | |
| 8,689,569 | B2 * | 4/2014 | Uratani | G05D 23/24 62/3.2 |
| 9,305,857 | B2 * | 4/2016 | Fukano | H04N 9/3194 |
| 9,752,807 | B2 * | 9/2017 | Osuman | H10N 10/17 |
| 9,926,880 | B2 * | 3/2018 | Nishida | F02D 41/26 |
| 10,079,087 | B2 * | 9/2018 | Matsumoto | F02D 41/1408 |
| 10,746,804 | B2 * | 8/2020 | Park | G01R 31/367 |
| 11,369,993 | B2 * | 6/2022 | Yazaki | A61B 8/4494 |
| 11,742,124 | B2 * | 8/2023 | Tokura | F16K 31/0675 251/129.05 |
| 2002/0121094 | A1 * | 9/2002 | VanHoudt | H01S 5/02415 62/3.3 |
| 2004/0240135 | A1 | 12/2004 | Wong et al. | |
| 2008/0106293 | A1 | 5/2008 | Hashimoto | |
| 2009/0120104 | A1 * | 5/2009 | Federer | B01L 7/52 422/119 |
| 2017/0023281 | A1 * | 1/2017 | Fromm | B01L 7/52 |

FOREIGN PATENT DOCUMENTS

| | | | |
|---|---|---|---|
| CN | 202424532 | U | 9/2012 |
| CN | 104614674 | A | 5/2015 |
| CN | 105094173 | A | 11/2015 |
| CN | 105242716 | A | 1/2016 |
| CN | 109656281 | A | 4/2019 |
| CN | 114204924 | A | 3/2022 |
| WO | 2006067838 | A1 | 6/2006 |
| WO | 2022048445 | A1 | 3/2022 |

OTHER PUBLICATIONS

First Office Action, including Search Report, for Chinese Patent Application No. 202010929394.4, dated Jun. 21, 2022, 21 pages.

Second Office Action, including Search Report, for Chinese Patent Application No. 202010929394.4, dated Jan. 11, 2023, 15 pages.

* cited by examiner

- prior art -

- prior art -

CONTROLLER AND CONTROL METHOD OF THERMOELECTRIC COOLER-HEATER DEVICE

CROSS-REFERENCES TO RELATED APPLICATION

The present application claims priority to a Chinese patent application No. 202010929394.4, entitled "Controller and Control Method of Thermoelectric Cooler-Heater Device", filed on Sep. 7, 2020, which is incorporated herein by reference to its entire specification, claims, drawings and abstract.

FIELD OF THE DISCLOSURE

The present disclosure relates to a technical field of electronic circuits, in particular to a controller and a control method of a thermoelectric cooler-heater device.

DESCRIPTION OF THE RELATED ART

A thermoelectric cooler-heater device (sometimes also referring to a thermoelectric cooler or a TEC) is a device that uses Peltier effect to control temperature. A thermoelectric cooler-heater device includes two types of conductors or semiconductors on a current path. With a change of current direction, heat absorption or heat release occurs at a connection end of the two types of conductors or semiconductors, so that an environment temperature can be adjusted. A controller may provide a forward driving current to the thermoelectric cooler-heater device to extract heat, thus operating in a cooling mode, or the controller may provide a reverse driving current to supply heat, thus operating in a heating mode. Commercial thermoelectric cooler-heater devices use, for example, bismuth tellurite semiconductors.

In fields, such as optical communication, infrared sensing, medical, household cold water heaters and so on, a thermoelectric cooler-heater device can be used as a high-precision temperature control device. FIG. 1 shows an optical communication module 100 using a thermoelectric cooler-heater device to control laser wavelength. A controller 110 is connected to the thermoelectric cooler-heater device 120 to provide a driving current Ia, and is connected to a temperature sensor 130 to obtain a temperature detection signal Vs. A laser device 10 is adjacent to the thermoelectric cooler-heater device 120. Temperature regulation capability of the thermoelectric cooler-heater device 120 is related to a direction and/or a magnitude of the driving current Ia. The controller 110 may control the driving current Ia of the thermoelectric cooler-heater device 120 according to the temperature detection signal, so that the environment temperature can be accurately controlled and the laser wavelength of the laser device 10 can be further controlled. Therefore, the controller 110 is a key module for adjusting the laser wavelength in the optical communication module 100.

The temperature regulation capability of the thermoelectric cooler-heater device is implemented based on a superimposed effect of Peltier effect and resistance heating effect, thus showing non-monotonic characteristics, as shown in FIG. 2. In a cooling mode, cooling capability and self-heating of the thermoelectric cooler-heater device 120 increase with an increase of a forward driving current, and the self-heating of the thermoelectric cooler-heater device 120 may even exceeds the cooling capability, which may increase the environment temperature based on the forward driving current. In the heating mode, the thermoelectric cooler-heater device 120 may cause intense heat which may damage the device. Existing controllers of thermoelectric cooler-heater devices still have some problems, such as having complex circuit structure, large chip size, low circuit efficiency, poor monotonicity of temperature regulation, and causing damage to devices under intense heat.

SUMMARY OF THE DISCLOSURE

In view of the above problems, an objective of the present disclosure is to provide a controller and a control method of a thermoelectric cooler-heater device, wherein, in a cooling mode, a switching power supply is used to provide continuous output to improve monotonicity, and in a heating mode, a constant-current constant-voltage power supply is used to provide pulse output to improve circuit efficiency and provide a protection function.

According to an aspect of the present disclosure, a controller of a thermoelectric cooler-heater device is provided, and comprises: a switching power supply, coupled to the thermoelectric cooler-heater device to provide a first driving current; and a constant-current constant-voltage power supply, coupled to the thermoelectric cooler-heater device to provide a second driving current, wherein, according to a temperature detection signal, one of the switching power supply and the constant-current constant-voltage power supply is configured to operate, the first driving current is a continuous driving current and flows from an anode end to a cathode end of the thermoelectric cooler-heater device, and the second driving current is a pulse driving current and flows from the cathode end to the anode end of the thermoelectric cooler-heater device.

In some embodiments, when the temperature detection signal is higher than a temperature preset signal, the controller is configured to operate in a cooling mode, wherein the switching power supply is operated and the constant-current constant-voltage power supply is turned off; and when the temperature detection signal is lower than the temperature preset signal, the controller is configured to operate in a heating mode, wherein the switching power supply is turned off and the constant-current constant-voltage power supply is operated.

In some embodiments, a current value of the first driving current corresponds to a deviation of the temperature detection signal relative to the temperature preset signal, and a duty cycle of the second driving current corresponds to a deviation of the temperature detection signal relative to the temperature preset signal.

In some embodiments, the anode end of the thermoelectric cooler-heater device is grounded, and the cathode end of the thermoelectric cooler-heater device is connected to a driving terminal of the controller.

In some embodiments, the switching power supply has a BUCK topology, and is configured to provide a reverse driving current as the first driving current at the driving terminal.

In some embodiments, the switching power supply comprises: a first switching transistor and a second switching transistor connected in series between a power supply terminal and the driving terminal; and an inductor connected between an intermediate node, which is between the first switch transistor and the second switch transistor, and a ground terminal.

In some embodiments, the constant-current constant-voltage power supply comprises a regulating transistor, which is connected between a power supply terminal and the driving terminal, and is configured to provide a forward driving current as the second driving current at the driving terminal.

In some embodiments, the cathode end of the thermoelectric cooler-heater device is coupled to the power supply terminal, and the anode end of the thermoelectric cooler-heater device is coupled to the driving terminal of the controller.

In some embodiments, the switching power supply has a BOOST topology and is configured to provide a forward driving current as the first driving current at the driving terminal.

In some embodiments, the constant-current constant-voltage power supply comprises a regulating transistor, which is connected between a power supply terminal and the driving terminal, and is configured to provide a reverse driving current as the second driving current at the driving terminal.

In some embodiments, the second driving current has a constant voltage value and a constant current value, matching a rated parameter of the thermoelectric cooler-heater device.

According to another aspect of the present disclosure, a control method of a thermoelectric cooler-heater device is provided, and comprises: judging that an operation mode of the thermoelectric cooler-heater device is one of a cooling mode and a heating mode according to a temperature detection signal; in the cooling mode, providing a first driving current to the thermoelectric cooler-heater device, the first driving current being a continuous driving current and flowing from an anode end to a cathode end of the thermoelectric cooler-heater device; and in the heating mode, providing a second driving current to the thermoelectric cooler-heater device, the second driving current being a pulse driving current and flowing from the cathode end to the anode end of the thermoelectric cooler-heater device.

In some embodiments, a current value of the first driving current corresponds to a deviation of the temperature detection signal relative to a temperature preset signal, and a duty cycle of the second driving current corresponds to a deviation of the temperature detection signal relative to the temperature preset signal.

In some embodiments, the anode end of the thermoelectric cooler-heater device is grounded, and the cathode end is connected to a driving terminal of the controller.

In some embodiments, a reverse driving current is provided as the first driving current at the driving terminal by a switching power supply having a BUCK topology.

In some embodiments, a forward driving current is provided as the second driving current at the driving terminal by a constant-current constant-voltage power supply.

In some embodiments, the cathode end of the thermoelectric cooler-heater device is coupled to a power supply terminal, and the anode end of the thermoelectric cooler-heater device is coupled to the driving terminal of the controller.

In some embodiments, a reverse driving current is provided as the first driving current at the driving terminal by a switching power supply having a BUCK topology.

In some embodiments, a forward driving current is provided as the second driving current at the driving terminal by a constant-current constant-voltage power supply.

In some embodiments, the second driving current has a constant voltage value and a constant current value, matching a rated parameter of the thermoelectric cooler-heater device.

In the controller according to embodiments of the present disclosure, one of a switching power supply and a constant-current constant-voltage power supply is configured to operate according to a temperature detection signal. During an operation of one of the switching power supply and the constant-current constant-voltage power supply, in the other one of the switching power supply and the constant-current constant-voltage power supply, there is no need to use additional switching transistors to provide a current path, thus reducing the number of power transistors in the controller. Therefore, circuit structure of the controller can be simplified and chip size can be small.

Furthermore, asymmetric driving scheme can be adopted in the cooling mode and the heating mode, wherein the switching power supply generates a continuous driving current in the cooling mode, and the constant-current constant-voltage power supply generates a pulse driving current in the heating mode. In the heating mode, because of the pulse driving current, self-heating of the thermoelectric cooler-heater device can be reduced, thus preventing devices in surrounding environment from being damaged by intense heat.

In some embodiments, the pulse driving current generated by the constant-current constant-voltage power supply has a constant voltage value and a constant current value, which match a rated parameter of the thermoelectric cooler-heater device, thereby optimizing heating efficiency of the thermoelectric cooler-heater device.

In some embodiments, the switching power supply has a BUCK topology, and the anode end of the thermoelectric cooler-heater device and an inductor of the switching power supply are both connected to a ground terminal. The switching power supply is configured to provide a reverse driving current at a driving terminal of a controller chip, and the constant-current constant-voltage power supply is configured to provide a forward driving current at the driving terminal of the controller chip. In that controller (chip), the number of power transistors can be reduced to three, including only two switching transistors and one regulating transistor. Therefore, circuit structure of the controller can be simplified, and chip size can be small.

BRIEF DESCRIPTION OF THE DRAWINGS

The above and other objectives, advantages and features of the present disclosure will become more fully understood from the detailed description given hereinbelow in connection with the appended drawings, and wherein.

DETAILED DESCRIPTION OF EMBODIMENTS OF THE DISCLOSURE

Figure 1:
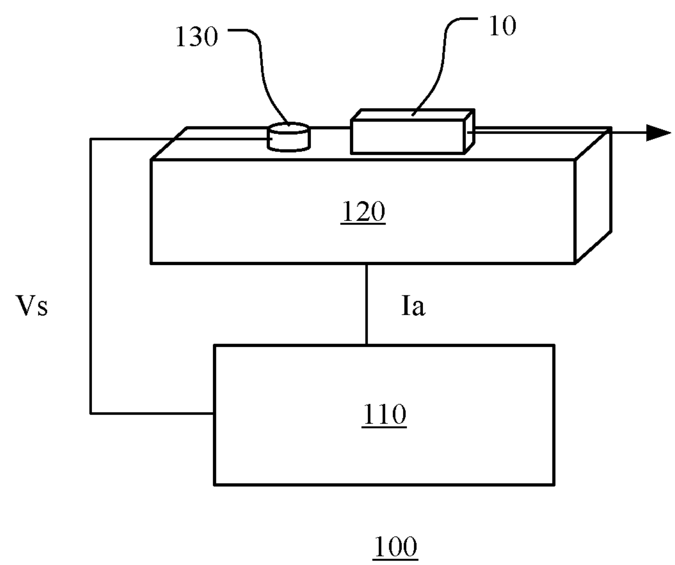
FIG. 1 shows a schematic diagram of an optical communication module using a thermoelectric cooler-heater device to control a laser wavelength.
Figure 2:
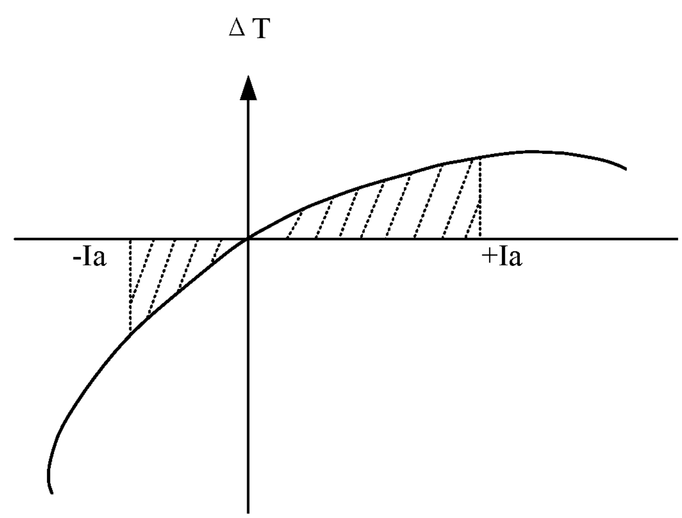
FIG. 2 shows a graph of an operation current and temperature regulation capability of the thermoelectric cooler-heater device.

For making the present disclosure easily understood, a more complete description of the present disclosure is provided below with reference to the associated drawings. Some preferred embodiments of the present disclosure are shown in the drawings. However, the present disclosure may be implemented in different forms and is not limited to the embodiments described herein. These embodiments are provided for making the present disclosure more thoroughly and fully understood.

Figure 3:
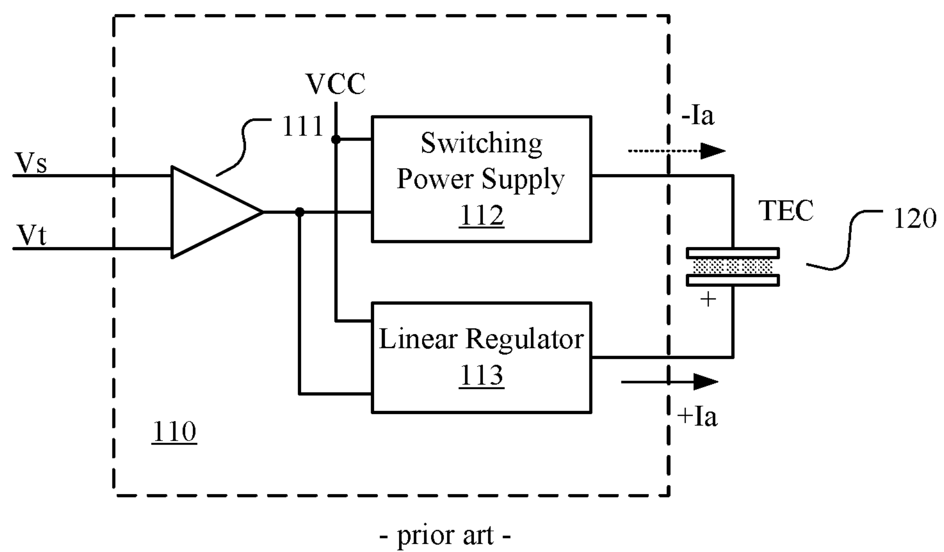
FIG. 3 shows a schematic block diagram of a controller of a thermoelectric cooler-heater device according to the prior art.

FIG. 3 shows a schematic block diagram of a controller of a thermoelectric cooler-heater device according to the prior art.

The controller 110 includes an operational amplifier 111, a switching power supply 112 and a linear regulator 113. The operational amplifier 111 has a first input terminal receiving a temperature reference signal Vt, a second input terminal receiving a temperature detection signal Vs, and an output terminal providing an error signal. The temperature detection signal Vs is, for example, a detection signal obtained by use of a temperature sensor, and is used to represent an environment temperature near the thermoelectric cooler-heater device. The temperature reference signal Vt is used to represent a preset temperature near the thermoelectric cooler-heater device. An output terminal of the switching power supply 112 is connected to a cathode end of the thermoelectric cooler-heater device 120, and an output terminal of the linear regulator 113 is connected to an anode end of the thermoelectric cooler-heater device 120. The switching power supply 112 and the linear regulator 113 are configured to receive the error signal.

When the error signal indicates that the environment temperature is higher than the preset temperature, the controller is configured to operate in a cooling mode, in which the linear regulator 113 is operated to provide a driving current Ia, and an internal switching transistor of the switching power supply 112 grounds the cathode end of the thermoelectric cooler-heater device 120 to absorb the driving current Ia. The driving current Ia in this condition is a forward driving current flowing from the anode end to the cathode end of the thermoelectric cooler-heater device 120, thereby extracting heat to lower the environment temperature.

When the error signal indicates that the environment temperature is lower than the preset temperature, the controller is configured to operate in a heating mode, in which the switching power supply 112 is operated to provide the driving current Ia, and an internal switching transistor of the linear regulator 113 grounds the anode end of the thermoelectric cooler-heater device 120 to absorb the driving current Ia. The driving current Ia in this condition is a reverse driving current flowing from the cathode end to the anode end of the thermoelectric cooler-heater device 120, thereby supplying heat to raise the environment temperature.

In the controller according to the prior art, the switching power supply 112 and the linear regulator 113 at least include four switching transistors to form an H-bridge, and when one of the switching power supply 112 and the linear regulator 113 is configured to supply the driving current, the other one of the switching power supply 112 and the linear regulator 113 may absorb the driving current. Therefore, the circuit structure of the controller is complex and the chip size may be large. On the other hand, one of the switching power supply 112 and the linear regulator 113 is configured to provide a continuous driving current, whether in the cooling mode or in the heating mode. However, in the heating mode, the continuous driving current will cause severe self-heating of the thermoelectric cooler-heater device 120 and even damage the device due to intense heat.

Figure 4:
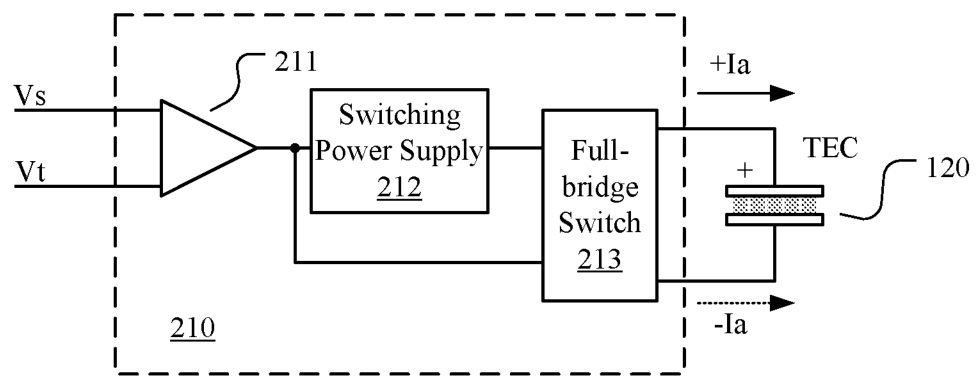
FIG. 4 shows a schematic block diagram of another controller of a thermoelectric cooler-heater device according to the prior art.

FIG. 4 shows a schematic block diagram of another controller of a thermoelectric cooler-heater device according to the prior art.

The controller 210 includes an operational amplifier 211, a switching power supply 212 and a full-bridge switch 213. The operational amplifier 211 has a first input terminal receiving a temperature reference signal Vt, a second input terminal receiving a temperature detection signal Vs and an output terminal supplying an error signal. The full-bridge switch 213 is connected between the switching power supply 112 and the thermoelectric cooler-heater device 120. The switching power supply 212 and the full-bridge switch 213 are configured to receive the error signal. The switching power supply 212 is configured to generate a driving current of a corresponding magnitude according to the error signal, and the full-bridge switch 213 is configured to select a direction of the driving current according to a polarity of the error signal.

When the error signal indicates that the environment temperature is higher than the preset temperature, the controller is configured to operate in a cooling mode, in which the switching power supply 212 is operated to provide the driving current Ia, and the full-bridge switch 213 selects the direction of the driving current Ia such that the driving current Ia is a forward driving current flowing from the anode end to the cathode end of the thermoelectric cooler-heater device 120, thereby extracting heat to lower the environment temperature.

When the error signal indicates that the environment temperature is lower than the preset temperature, the controller is configured to operate in a heating mode, in which the switching power supply 212 is operated to provide the driving current Ia, and the full-bridge switch 213 selects the direction of the driving current Ia such that the driving current Ia is a reverse driving current flowing from the cathode end to the anode end of the thermoelectric cooler-heater device 120, thereby supplying heat to raise the environment temperature.

In the controller according to the prior art, the switching power supply 212 at least includes two switching transistors to form a BUCK topology, and the full-bridge switch 213 at least includes four switching transistors to form a full-bridge, so as to realize direction switching of the driving current. Therefore, the circuit structure of the controller is complex and the chip size may be large. On the other hand, the switching power supply 212 is configured to provide a continuous driving current, whether in the cooling mode or in the heating mode. However, in the heating mode, the continuous driving current will cause severe self-heating of the thermoelectric cooler-heater device 120 and even damage the device due to intense heat.

Figure 5:
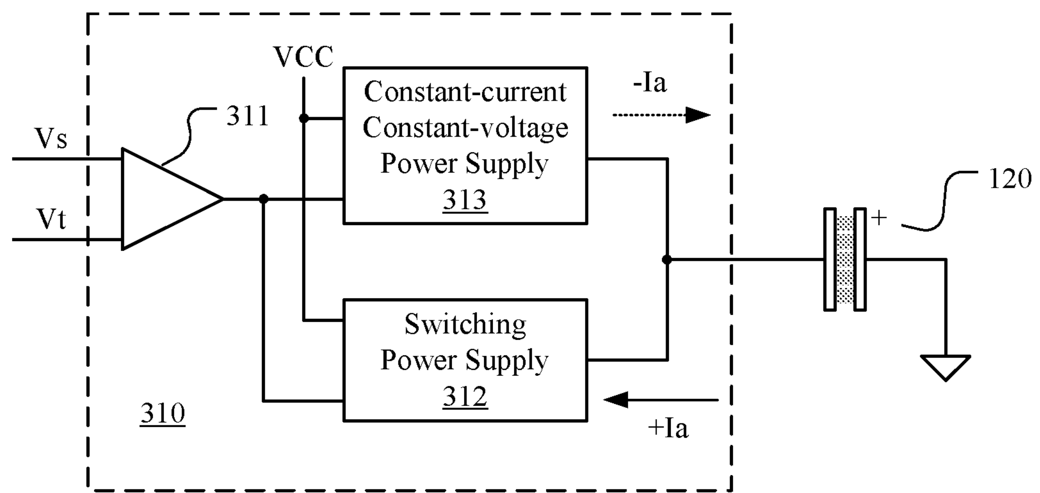
FIG. 5 shows a schematic block diagram of a controller of a thermoelectric cooler-heater device according to an embodiment of the present disclosure.

FIG. 5 shows a schematic block diagram of a controller of a thermoelectric cooler-heater device according to an embodiment of the present disclosure. As shown in FIG. 5, an anode end of the thermoelectric cooler-heater device 120 is grounded and a cathode end of the thermoelectric cooler-heater device 120 is connected to a driving terminal of the controller 310.

The controller 310 includes an operational amplifier 311, a switching power supply 312 and a constant-current constant-voltage power supply 313. The operational amplifier 311 has a first input terminal receiving a temperature reference signal Vt, a second input terminal receiving a temperature detection signal Vs and an output terminal supplying an error signal. An output terminal of the switching power supply 312 and an output terminal of the constant-current constant-voltage power supply 313 are respectively connected to a driving terminal of the controller 310. The switching power supply 312 and the constant-current constant-voltage power supply 313 are respectively configured to receive the error signal. The switching power supply 312 is, for example, a power converter having a BUCK topology.

When the error signal indicates that the environment temperature is higher than a preset temperature, the controller is configured to operate in a cooling mode, in which the constant-current constant-voltage power supply 313 is turned off and the switching power supply 312 is operated to absorb a driving current Ia, which is a forward driving current flowing from the anode end to the cathode end of the thermoelectric cooler-heater device 120, thereby extracting heat to lower the environment temperature. The switching power supply 312 is configured to generate a continuous driving current in the cooling mode.

When the error signal indicates that the environment temperature is lower than the preset temperature, the controller is configured to operate in a heating mode, in which the switching power supply 312 is turned off and the constant-current constant-voltage power supply 313 is operated to provide the driving current Ia, which is a reverse driving current flowing from the cathode end to the anode end of the thermoelectric cooler-heater device 120, thereby supplying heat to raise the environment temperature. The constant-current constant-voltage power supply 313 is configured to generate a pulse driving current in the heating mode.

In the controller according to this embodiment, the switching power supply 312 and the constant-current constant-voltage power supply 313 are selectively operated. In the controller, no additional switching transistor is needed to provide a current path, thus the number of power transistors in the controller can be reduced. Therefore, the circuit structure of the controller is simplified and the chip size can be small.

Further, an asymmetric driving scheme is adopted in the cooling mode and the heating mode, in which the switching power supply 312 is configured to generate the continuous driving current in the cooling mode, and the constant-current constant-voltage power supply 313 is configured to generate the pulse driving current in the heating mode. In the heating mode, since the pulse driving current is applied, self-heating of the thermoelectric cooler-heater device 120 can be reduced, thereby preventing devices in surrounding environment from being damaged by intense heat.

Further, the pulse driving current generated by the constant-current constant-voltage power supply 313 has a constant voltage value and a constant current value, which match a rated parameter of the thermoelectric cooler-heater device, thus heating efficiency of the thermoelectric cooler-heater device 120 can be optimized.

Figure 6:
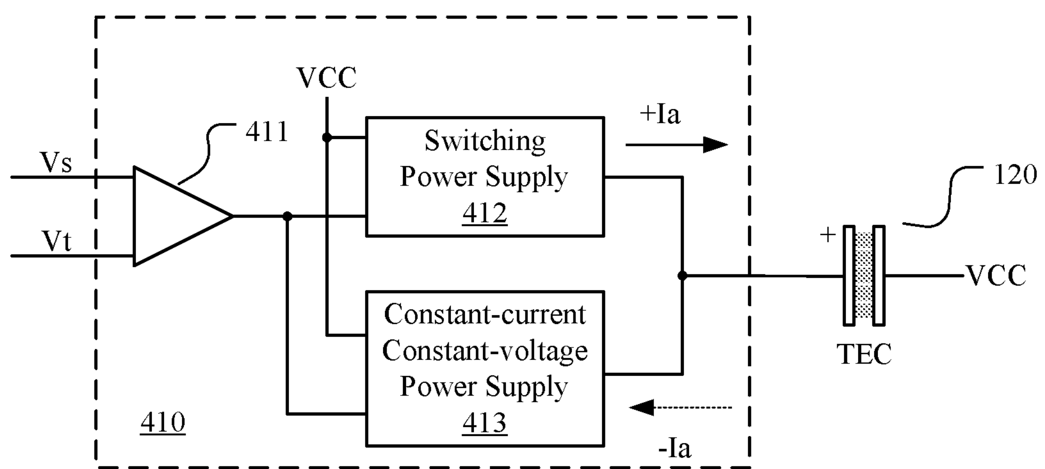
FIG. 6 shows a schematic block diagram of a controller of a thermoelectric cooler-heater device according to a second embodiment of the present disclosure.

FIG. 6 shows a schematic block diagram of a controller of a thermoelectric cooler-heater device according to a second embodiment of the present disclosure. As shown in FIG. 6, a cathode end of the thermoelectric cooler-heater device 120 is connected to a power supply terminal VCC and an anode end of the thermoelectric cooler-heater device 120 is connected to a driving terminal of the controller 410.

The controller 410 includes an operational amplifier 411, a switching power supply 412 and a constant-current constant-voltage power supply 413. The operational amplifier 411 has a first input terminal receiving a temperature reference signal Vt, a second input terminal receiving a temperature detection signal Vs and an output terminal supplying an error signal. An output terminal of the switching power supply 412 and an output terminal of the constant-current constant-voltage power supply 413 are respectively connected to the driving terminal of the controller 410. The switching power supply 412 and the constant-current constant-voltage power supply 413 are respectively configured to receive the error signal. The switching power supply 412 is, for example, a power converter having a BOOST topology.

When the error signal indicates that an environment temperature is higher than a preset temperature, the controller is configured to operate in a cooling mode, in which the constant-current constant-voltage power supply 413 is turned off and the switching power supply 412 is operated to provide a driving current Ia, which is a forward driving current flowing from the anode end to the cathode end of the thermoelectric cooler-heater device 120, thereby extracting heat to lower the environment temperature. The switching power supply 412 is configured to generate a continuous driving current in the cooling mode.

When the error signal indicates that the environment temperature is lower than the preset temperature, the controller is configured to operate in a heating mode, in which the switching power supply 412 is turned off and the constant-current constant-voltage power supply 413 is operated to absorb the driving current Ia, which is a reverse driving current flowing from the cathode end to the anode end of the thermoelectric cooler-heater device 120, thereby supplying heat to raise the environment temperature. The constant-current constant-voltage power supply 413 is configured to generate a pulse driving current in the heating mode.

The controller according to the second embodiment is similar to the controller according to the first embodiment, the circuit structure of the controller is simplified and the chip size can be small. In the heating mode, since the pulse driving current is applied, it is possible to prevent devices in surrounding environment from being damaged by intense heat, and the pulse driving current has a constant voltage value and a constant current value, thus heating efficiency of the thermoelectric cooler-heater device 120 can be optimized.

Figure 7:
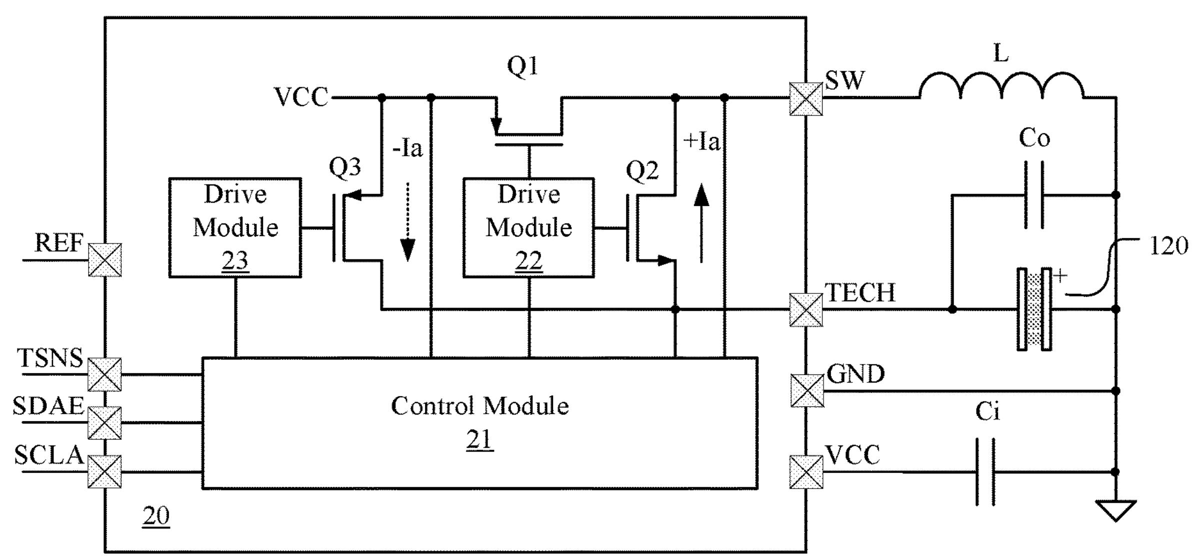
FIG. 7 shows a schematic circuit diagram of a control chip of a thermoelectric cooler-heater device according to a third embodiment of the present disclosure.

FIG. 7 shows a schematic circuit diagram of a control chip of a thermoelectric cooler-heater device according to a third embodiment of the present disclosure. A circuit structure of the control chip may be consistent with that of the controller shown in FIG. 5.

The control chip 20 receives a plurality of input signals and provides a plurality of output signals via a plurality of terminals. The control chip 20 receives an input voltage via a power supply terminal VCC, is grounded via a ground terminal GND, and receives a temperature reference signal Vt via a reference terminal REF. An anode end of the thermoelectric cooler-heater device 120 is grounded and a cathode end of the thermoelectric cooler-heater device 120 is connected to a driving terminal TECH of the control chip 20. A capacitor Ci is connected between terminals VCC and GND for filtering the input voltage. A capacitor Co is connected between the anode end and the cathode end of the thermoelectric cooler-heater device 120 for filtering the output voltage.

The control chip 20 includes a control module 21, a first drive module 22, a second drive module 23, switching transistors Q1 and Q2, and a regulating transistor Q3. The control module 21 is connected to an I2C bus via terminals SDAE and SCLA, so as to realize data communication with an external module, and is connected to a temperature sensor via terminal TSNS, so as to receive the temperature detection signal Vs.

The control module 21 may include, for example, a function of the aforementioned operational amplifier. The control module 21 is configured to generate a first control signal and a second control signal based on an error signal between the temperature detection signal Vs and the temperature reference signal Vt. The first drive module 22 is connected to the control module 21 to receive the first control signal, and is configured to generate a first gate driving signal and a second gate driving signal according to the first control signal. The second drive module 23 is connected to the control module 21 to receive the second control signal, and is configured to generate a third gate driving signal according to the second control signal.

The switching power supply includes a plurality of devices which may be located inside and outside the control chip 20. Inside the control chip 20, the switch transistors Q1 and Q2 are connected in series between the power supply terminal VCC and the drive terminal TECH, and an intermediate node between the switching transistors Q1 and Q2 is connected to a terminal SW. Outside the control chip 20, an inductor L is connected between the terminal SW and the ground terminal GND. The switching transistors Q1 and Q2 and the inductor L form a BUCK topology. The first drive module 22 is configured to provide the first gate driving signal and the second gate driving signal, which are used for controlling conduction states of the switch transistors Q1 and Q2, respectively. The inductor of the switching power supply is grounded to provide a reverse driving current, unlike the switching power supply in the controller according to the prior art. Therefore, when the switching power supply is under operating state, the switching power supply may absorb the driving current at the driving terminal TECH, so that a forward driving current is provided.

The constant-current constant-voltage power supply includes a plurality of devices which may be located inside the control chip 20. The regulating transistor Q3 is connected between the power supply terminal VCC and the driving terminal TECH. The second drive module 23 provides the third gate driving signal for controlling a conduction state of the regulating transistor Q3 to generate a pulse driving current. The second drive module 23 is further configured to control an operating point of the regulating transistor Q3 when the regulating transistor Q3 is turned on, so that the pulse driving current has a constant voltage value and a constant current value, which match a rated parameter of the thermoelectric cooler-heater device. Therefore, when the constant-current constant-voltage power supply is under an operating state, the switching power supply is configured to provide a driving current at the driving terminal TECH, so that a reverse driving current is provided.

In the control chip according to the embodiment, the switching power supply may have a BUCK topology, and the anode end of the thermoelectric cooler-heater device and the inductor of the switching power supply are connected to the ground terminal, thus a reverse driving current is provided at the driving terminal of the control chip. The regulating transistor of the constant-current constant-voltage power supply is configured to provide a forward driving current at the driving terminal of the control chip. According to the temperature detection signal, one of the switching power supply and the constant-current constant-voltage power supply is configured to operate, so that the number of power transistors in the controller can be reduced to three, including only two switching transistors and one regulating transistor, without using additional switching transistors to provide a current path in the control chip. Therefore, the circuit structure of the controller is simplified and the chip size can be small.

Figure 8:
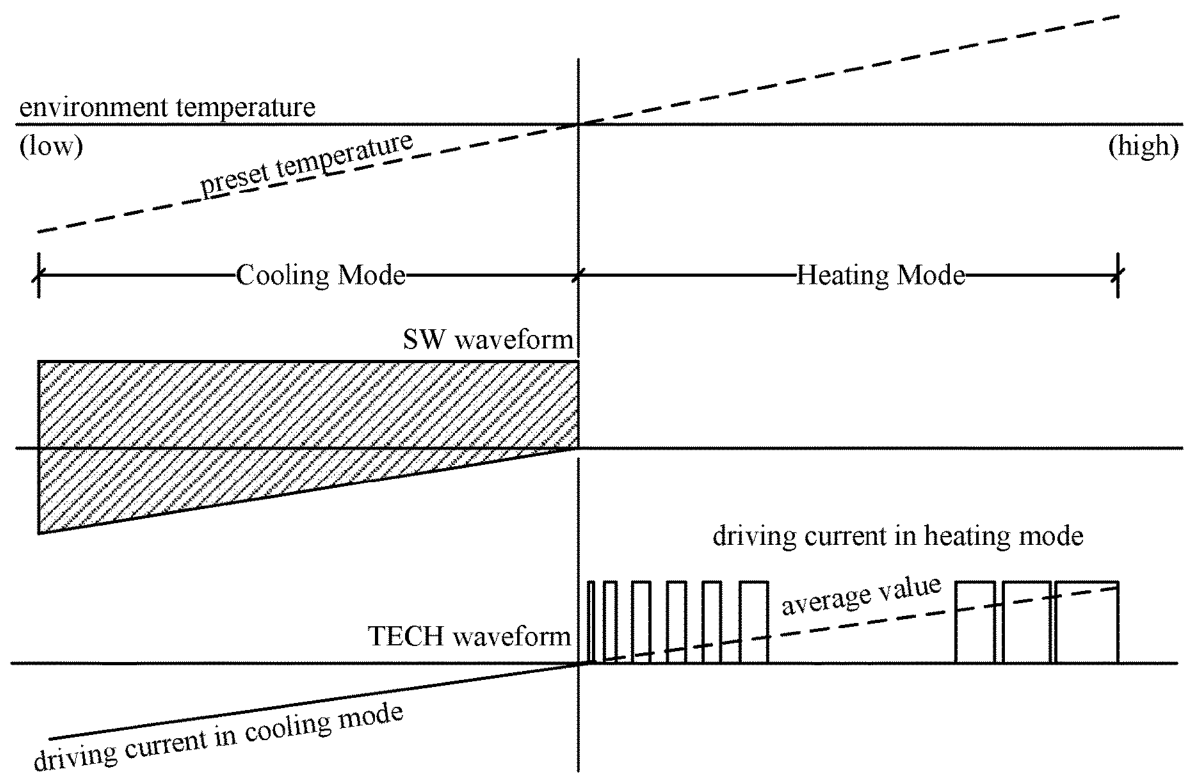
FIG. 8 shows an operation waveform diagram of the control chip of the thermoelectric cooler-heater device according to the third embodiment of the present disclosure.

FIG. 8 shows an operation waveform diagram of the control chip of the thermoelectric cooler-heater device according to the third embodiment of the present disclosure.

As described above, the control module 21 in the control chip 20 generates the first control signal and the second control signal based on the error signal between the temperature detection signal Vs and the temperature reference signal Vt. The first drive module 22 generates the first gate driving signal and the second gate driving signal according to the first control signal, and the second drive module 23 generates the third gate driving signal according to the second control signal.

When the error signal indicates that the environment temperature is higher than a preset temperature, the first drive module 22 controls the switching transistors Q1 and Q2 to be turned on and off alternately, so that the switching power supply is operated, and the second drive module 23 controls the regulating transistor Q3 to be turned off, so that the constant-current constant-voltage power supply is turned off. The switching power supply absorbs the driving current at the driving terminal TECH, which is a forward driving current flowing from the anode end to the cathode end of the thermoelectric cooler-heater device 120, thereby extracting heat to reduce the environment temperature. The forward driving current is a continuous driving current and has a current value corresponding to a magnitude of the error signal.

When the error signal indicates that the environment temperature is lower than the preset temperature, the first drive module 22 controls the switching transistors Q1 and Q2 to be turned off, so that the switching power supply is turned off, and the second drive module 23 controls the regulating transistor Q3 to be periodically turned on and off, so that the constant-current constant-voltage power supply is operated. The constant-current constant-voltage power supply supplies a driving current at the driving terminal TECH, which is a reverse driving current flowing from the cathode end to the anode end of the thermoelectric cooler-heater device 120, thereby supplying heat to raise the environment temperature. The reverse driving current is a pulse driving current and has a duty cycle corresponding to a magnitude of the error signal.

In addition, in the present disclosure, terms “including”, “comprising” or any other variation thereof are intended to encompass non-exclusive inclusion, so that a process, method, article or equipment including a set of elements, may not only include those elements, but may also include other elements that are not explicitly listed, or may further include elements inherent to such process, method, article or equipment. In the absence of more limitations, an element limited by a statement “comprises a . . . ” does not preclude an existence of another identical element in the process, method, article or equipment including said element.

Finally, it should be noted that, it is obvious that the embodiments in accordance with the present disclosure are described above, and these embodiments neither exhaustively describe all the details nor limit the present disclosure to only specific embodiments. Other variations or modifications in different forms may be made on the basis of the above description for those of ordinary skill in the art. Providing an exhaustive list of all embodiments here is not necessary and is also impossible. However, obvious variations or modifications derived therefrom are still within the protection scope of the present disclosure.

What is claimed is:

1. A controller of a thermoelectric cooler-heater device, wherein the controller comprises:

a driving terminal, coupled to the thermoelectric cooler-heater device;

a switching power supply, coupled to the thermoelectric cooler-heater device to provide a first driving current; and a constant-current constant-voltage power supply, coupled to the thermoelectric cooler-heater device to provide a second driving current, wherein, according to a temperature detection signal, one of the switching power supply and the constant-current constant-voltage power supply is configured to operate, the first driving current is a continuous driving current and flows from an anode end to a cathode end of the thermoelectric cooler-heater device, and the second driving current is a pulse driving current and flows from the cathode end to the anode end of the thermoelectric cooler-heater device, wherein the constant-current constant-voltage power supply comprises a regulating transistor, the switching power supply comprises a first switching transistor and a second switching transistor configured to be turned on alternately when the switching power supply operates, the regulating transistor and one of the first switching transistor and the second switching transistor are connected together to the driving terminal, and when the regulating transistor provides the second driving current, both the first switching transistor and the second switching transistor are turned off.

2. The controller according to claim 1, wherein, when the temperature detection signal is higher than a temperature preset signal, the controller is configured to operate in a cooling mode, wherein the switching power supply is operated and the constant-current constant-voltage power supply is turned off, and when the temperature detection signal is lower than the temperature preset signal, the controller is configured to operate in a heating mode, wherein the switching power supply is turned off and the constant-current constant-voltage power supply is operated.

3. The controller according to claim 1, wherein a current value of the first driving current corresponds to a deviation of the temperature detection signal relative to a temperature preset signal, and a duty cycle of the second driving current corresponds to a deviation of the temperature detection signal relative the temperature preset signal.

4. The controller according to claim 1, wherein the anode end of the thermoelectric cooler-heater device is grounded and the cathode end of the thermoelectric cooler-heater device is coupled to the driving terminal of the controller.

5. The controller according to claim 4, wherein the switching power supply has a BUCK topology, and is configured to provide a reverse driving current as the first driving current at the drive terminal.

6. The controller according to claim 5, wherein the switching power supply comprises:

the first switching transistor and the second switching transistor, which are connected in series between a power supply terminal and the driving terminal; and an inductor, connected between an intermediate node, which is between the first switch transistor and the second switch transistor, and a ground terminal.

7. The controller according to claim 4, wherein the regulating transistor is connected between a power supply terminal and the driving terminal, and is configured to provide a forward driving current as the second driving current at the driving terminal.

8. The controller according to claim 1, wherein the thermoelectric cooler-heater device has a cathode end coupled to a power supply terminal, and has an anode end coupled to the driving terminal of the controller.

9. The controller according to claim 8, wherein the switching power supply has a BOOST topology and is configured to provide a forward driving current as the first driving current at the drive terminal.

10. The controller according to claim 8, wherein the regulating transistor is connected between the power supply terminal and the driving terminal, and is configured to provide a reverse driving current as the second driving current at the driving terminal.

11. The controller according to claim 1, wherein the second driving current has a constant voltage value and a constant current value, matching a rated parameter of the thermoelectric cooler-heater device.

12. A control method of a thermoelectric cooler-heater device, wherein the control method is performed by using the controller according to claim 1, and the control method comprises:

according to the temperature detection signal, judging that an operation mode of the thermoelectric cooler-heater device is one of a cooling mode and a heating mode;

in the cooling mode, providing the first driving current to the thermoelectric cooler-heater device; and in the heating mode, providing the second driving current to the thermoelectric cooler-heater device.

13. The control method according to claim 12, wherein a current value of the first driving current corresponds to a deviation of the temperature detection signal relative to a temperature preset signal, and a duty cycle of the second driving current corresponds to a deviation of the temperature detection signal relative to the temperature preset signal.

14. The control method according to claim 12, wherein the anode end of the thermoelectric cooler-heater device is grounded and the cathode end of the thermoelectric cooler-heater device is coupled to the driving terminal of the controller.

15. The control method according to claim 14, wherein a reverse driving current is provided as the first driving current at the driving terminal by the switching power supply having a BUCK topology.

16. The control method according to claim 14, wherein a forward driving current is provided as the second driving current at the driving terminal by the constant-current constant-voltage power supply.

17. The control method according to claim 12, wherein the cathode end of the thermoelectric cooler-heater device is coupled to a power supply terminal and the anode end of the thermoelectric cooler-heater device is coupled to the driving terminal of the controller.

18. The control method according to claim 17, wherein a reverse driving current is provided as the first driving current at the driving terminal by the switching power supply having a BUCK topology.

19. The control method according to claim 17, wherein a forward driving current is provided as the second driving current at the driving terminal by the constant-current constant-voltage power supply.

20. The control method according to claim 12, wherein the second driving current has a constant voltage value and a constant current value, matching a rated parameter of the thermoelectric cooler-heater device.

* * * * *